United States Patent Office 3,467,857
Patented Sept. 16, 1969

3,467,857
CIRCUIT ARRANGEMENT FOR SYNTHETIC TESTING OF ELECTRICAL APPARATUS EMPLOYING A STEADY A.C. RECOVERY VOLTAGE SUPPLY APPLIED AFTER THE TRANSIENT RECOVERY VOLTAGE
David Philip Longworth, Lymm, England, assignor to Associated Electrical Industries Limited, London, England, a British company
Filed Apr. 24, 1967, Ser. No. 633,085
Claims priority, application Great Britain, May 16, 1966, 21,667/66
Int. Cl. G01r 31/14
U.S. Cl. 324—28                                  1 Claim

ABSTRACT OF THE DISCLOSURE

For testing it a specimen has its terminals connected through an auxiliary circuit breaker to a source supplying high amplitude current, also connected to an oscillatory series L/C circuit including a capacitor, a high D.C. voltage charging source for the capacitor, a switching means effectively completing the L/C circuit at a desired instant, and a rate capacitor connected across the L/C circuit, characterised in that an additional source supplying alternating current at an amplitude lower than that of the first current source is connected to the test terminals, and a switch is arranged for isolating said additional source from the L/C circuit.

---

This invention relates to the synthetic testing of electrical apparatus especially high power A.C. switch gear, applying a high current amplitude test simulating a rated short circuit current value, and a high voltage test simulating a transient recovery voltage, near the final current zero period, in the form of an oscillatory current matching the rate of change of the high current amplitude. Arrangements which are known for carrying out such tests comprise test terminals connected through an auxiliary circuit breaker to a source supplying high amplitude curent, also connected to an oscillatory series L/C circuit including a capacitor, a high D.C. voltage, charging source for the capacitor, a switching means effectively completing the L/C circuit at a desired instant, and a rate capacitor connected across the L/C circuit. The invention affords an improvement by additional means for applying after the transient recovery voltage a "steady" A.C. recovery voltage, which more realistically simulates the actual duty conditions after an operation of the circuit breaker.

Accordingly the present invention resides in a circuit arrangement for synthetic testing of electric apparatus comprising test terminals connected through an auxiliary circuit breaker to a source supplying high amplitude current and connected to an oscillatory series L/C circuit including a capacitor, a high D.C. voltage charging source for the capacitor, a switching means for effectively completing the L/C circuit at a desired instant, and a rate capacitor connected across the L/C circuit, characterised in that an additional source for supplying alternating current of a lower amplitude than the first current source to the test terminals, a switch for isolating said additional source from the L/C circuit and a resistor for effecting phase angle matching between the currents from the high amplitude source and the additional current source.

The additional current source may comprise an autotransformer having a primary winding portion connectible to a generator, and the higher voltage terminal connected to the test terminal, preferably through the resistor for phase angle matching. The means for effectively completing the L/C circuit preferably comprises a spark gap device with a firing electrode.

Figure 2:
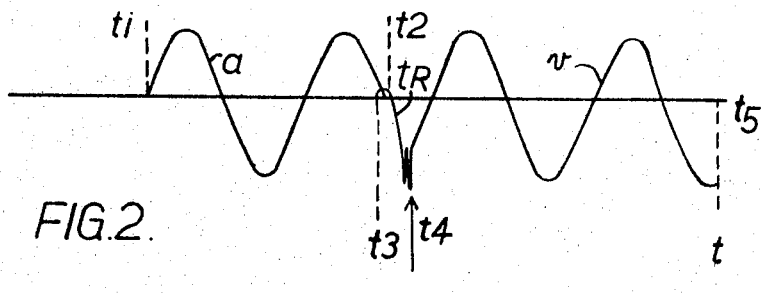
Figure 1:
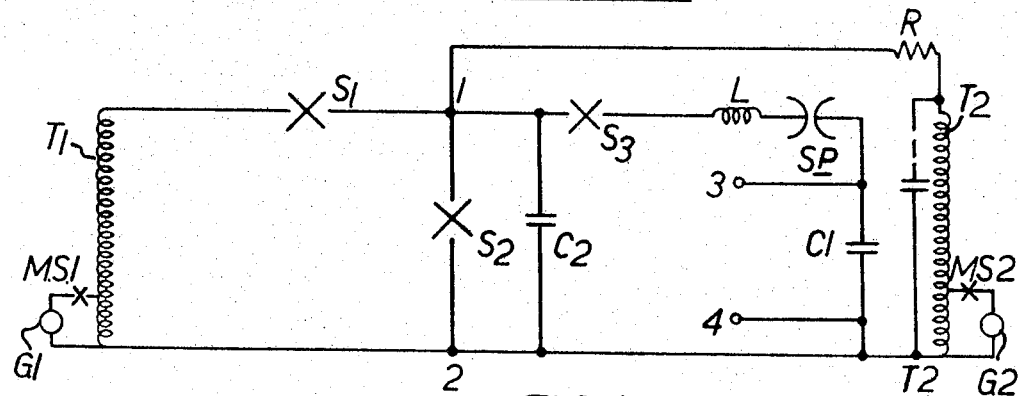

More details will become apparent and the invention will be better understood from the following description referring to the accompanying drawing in which FIG. 1 shows diagrammatically and by way of example a circuit arrangement embodying the invention, and FIG. 2 shows an oscillogram with reference to which the operation will be explained.

Referring to FIG. 1 a specimen to be tested, especially a circuit breaker S2, is connectible to test terminals 1, 2. A high amplitude alternating current source comprises in this case an autotransformer T1 with a primary winding portion connected through a switch MS1 to a generator G1, and with an output terminal connected through an auxiliary circuit breaker S1 to the test terminals 1.

An oscillatory circuit comprising a circuit inductance L in series with a capacitor C1 is also connected across the terminals 1, 2. The capacitor C1 is chargeable to a high D.C. voltage through terminals 3, 4. An initiating device, comprising a switching means such as a spark gap SP, preferably controlled by a firing electrode (not shown), is connected between the inductance and capacitor so that the oscillatory circuit can be effectively completed by applying a control signal to the firing electrode at a given instant. A rate control capacitor C2 is also connected in shunt with the L/C circuit to influence the rate of transient recovery voltage change at the test terminals.

An additional current source operating at normal duty frequency, such as 50 cycles per second, comprises in this case an autotransformer T2 having its output terminals connected to the test terminals 1, 2 and having a primary winding portion connected through a switch MS2 to a generator C2. The transformer T2 has a stray capacitance which must be considered additive to that of the capacitor C2 in the functioning of the circuit, and which is therefore indicated as a capacitor connected in parallel with transformer T2. A resistor R in series with the transformer T2 serves to facilitate the transition from the transient to steady recovery voltage and ensures phase matching, so that the phase angle of the current in the transformer T2 corresponds to that of the current in the transformer T1 at the instant of transition. Instead of the series resistor a shunt resistor may be used.

A switch S3 allows isolating the L/C circuit whereby to prevent resonance between the high voltage capacitor C1 and the inductance of the transformer T2.

The operation is as follows:

At the start of a test S1, S2, S3, MS1 and MS2 are closed. Short circuit current is applied from the transformer T1, the output of the transformer T2 being negligible as compared with that of the transformer T1. This current $a$ of FIG. 2 corresponds to a rated short circuit current of the circuit breaker S2. When S1 and S2 are opened the final current zero is approached from $t1$ to $t2$. The spark gap SP is triggered at $t3$ to connect the precharged capacitor C1 while S2, S3 are closed. At or near zero current instant $t2$ the voltage starts rising as determined by the L/C circuit and capacitor C2. This transient recovery period is indicated by TR in FIG. 2. At instant $t4$ this period is followed by the "steady" recovery voltage $v$ while switch S3 is opened to isolate the L/C circuit whereby to prevent the capacitor C1 to become resonant with the inductance of T2. The switch MS2 can be kept closed for a desired period to time $t5$.

While a preferred embodiment of the invention has been shown and described it will be understood that variations are possible without departing from the invention as defined by the appended claim. Details of the heavy current and high voltage branches can be chosen to meet specific requirements, and instead of the spark gap SP equivalent switching means can be employed for completing the L/C circuit at a predetermined instant.

I claim:

1. A circuit arrangement for synthetic testing of electric apparatus comprising test terminals connected through an auxiliary circuit breaker to a source supplying high amplitude current and connected to an oscillatory series L/C circuit including a capacitor, a switching means for effectively completing the L/C circuit at a desired instant, and a rate capacitor connected across the L/C circuit, characterised by an additional source for supplying alternating current of a lower amplitude than the first current source to the test terminals, a switch for isolating said additional source from the L/C circuit, and a resistor for effecting phase angle matching between the currents supplied from the high amplitude source and the additional current source.

References Cited

Electronics and Power, Synthetic Testing of Circuit Breakers, November 1964, vol. 10, pp. 395–398.

RUDOLPH V. ROLINEC, Primary Examiner

E. L. STOLARUN, Assistant Examiner